US008668179B2

(12) United States Patent
Corn et al.

(10) Patent No.: US 8,668,179 B2
(45) Date of Patent: Mar. 11, 2014

(54) MOUNT FOR AN ELECTRONIC DEVICE

(75) Inventors: Joshua A. Corn, Olathe, KS (US); Jeffrey D. Minelli, Overland Park, KS (US); Brian G. Schoenfish, Kansas City, KS (US); Marcus A. Moilanen, Overland Park, KS (US); Stephen P. Waite, Blue Springs, MO (US)

(73) Assignee: Garmin Switzerland GmbH (CH)

( * ) Notice: Subject to any disclaimer, the term of this patent is extended or adjusted under 35 U.S.C. 154(b) by 609 days.

(21) Appl. No.: 12/335,038

(22) Filed: Dec. 15, 2008

(65) Prior Publication Data

US 2009/0250570 A1    Oct. 8, 2009

Related U.S. Application Data

(60) Provisional application No. 61/097,980, filed on Sep. 18, 2008, provisional application No. 61/043,198, filed on Apr. 8, 2008.

(51) Int. Cl.
*A47B 91/00* (2006.01)
*F16M 11/02* (2006.01)
*A47F 5/00* (2006.01)

(52) U.S. Cl.
USPC ............... 248/346.01; 248/181.1; 248/310; 248/910; 248/920; 248/921; 248/922; 248/923; 379/420.04; 379/454; 379/455; 361/679.01; 361/679.3

(58) Field of Classification Search
USPC ............ 248/676, 683, 183.1, 178.1, 346.2, 248/346.01, 181.1, 205.5–205.8, 248/206.1–206.2, 292.12, 104, 310, 910, 248/161, 157, 292.11, 291.1, 288.11, 483, 248/174, 920–923, 346.11, 346.4; 379/420.04, 426, 446, 454, 455; 361/681–682, 679.01, 679.3
See application file for complete search history.

(56) References Cited

U.S. PATENT DOCUMENTS

D397,120 S  *  8/1998  Liou ............................. D14/229
5,845,885 A  * 12/1998  Carnevali .................... 248/181.1

(Continued)

FOREIGN PATENT DOCUMENTS

KR    10-1999-0058187    7/1999

OTHER PUBLICATIONS

International Search Report from corresponding International Application No. PCT/US2009/039343, dated Apr. 2, 2009.

(Continued)

*Primary Examiner* — Terrell McKinnon
*Assistant Examiner* — Christopher Garft
(74) *Attorney, Agent, or Firm* — Samuel M. Korte; Mohammad M. Ali

(57) ABSTRACT

A mounting device that securely supports an electronic device to a surface such as a vehicle dashboard. The mounting device comprises a flexible base for placement on a mounting surface and a bendable frame attached to or otherwise coupled with the base to permit the base to be shaped to at least partially conform to contours on the mounting surface. The base may be partially formed of a material that provides sufficient friction between its lower surface and the mounting surface to resist unwanted movement. The frame may be formed of aluminum and may include a central portion and a plurality of appendages each independently movable about at least two axes of movement. Each of the appendages may include a connecting link joined to the central portion and a pair of arms extending from the connecting link and movable relative to one another and relative to the central portion.

18 Claims, 3 Drawing Sheets

(56) References Cited

U.S. PATENT DOCUMENTS

| | | | |
|---|---|---|---|
| 6,073,902 A * | 6/2000 | Hiles | 248/346.2 |
| 6,129,321 A | 10/2000 | Minelli | 248/183.1 |
| 6,173,933 B1 | 1/2001 | Whiteside et al. | 248/276.1 |
| 6,439,530 B1 * | 8/2002 | Schoenfish et al. | 248/346.06 |
| 7,296,771 B2 * | 11/2007 | Kalis et al. | 248/288.31 |
| 7,682,543 B2 * | 3/2010 | Carnevali | 264/255 |
| 8,505,861 B2 * | 8/2013 | Carnevali | 248/188.7 |
| 2005/0199668 A1* | 9/2005 | Wheatley | 224/483 |
| 2006/0131467 A1 | 6/2006 | Wang | 248/276.1 |
| 2007/0012840 A1* | 1/2007 | Kalis et al. | 248/288.31 |
| 2007/0262216 A1 | 11/2007 | Wang | 248/205.3 |

OTHER PUBLICATIONS

Garmin Bean Bag Mount first offered for sale in the United States Jul. 22, 1998. https://buy.garmin.com/shop/shop.do?pID=633.

Garmin Friction Mount, first offered for sale in the United States Dec. 27, 2004 https://buy.garmin.com/shop/shop.do?pID=1232.

U.S. Appl. No. 10/950,857 entitled Friction Mount Apparatus for an Electronic Device, filed Sep. 27, 2004.

* cited by examiner

MOUNT FOR AN ELECTRONIC DEVICE

RELATED APPLICATIONS

This nonprovisional patent application claims priority benefit, with regard to all common subject matter, of earlier-filed U.S. provisional patent applications titled "Improved Mounting Devices And Systems For Electronic Devices," Ser. No. 61/043,198, filed Apr. 8, 2008, and "Mount for an Electronic Device," Ser. No. 61/097,980, filed Sep. 18, 2008. Each of the above-identified applications is hereby incorporated by reference in their entirety into the present application.

BACKGROUND OF THE INVENTION

It is often desirable to removably mount electronic devices within vehicles so the devices can be used inside or outside the vehicles. Many different mounting devices have been created for this purpose. One type includes an attachment mechanism for attachment to an electronic device and a suction cup for supporting the attachment mechanism to a vehicle windshield, dash, or other mounting surface. Although suction cup mounts can conveniently position electronic devices within vehicles, they invariably lose suction over time and fall from their mounting surfaces. Other known mounting devices eliminate this problem by using adhesives or fasteners to more securely attach themselves to a vehicle dash or other surface, but the adhesives or fasteners often damage and/or leave residue on their mounting surfaces. Another type of mounting device includes a base filled with lead pellets, rocks, or other weights to resist undesired movement on the mounting surface. Unfortunately, this type of mount is relatively expensive to manufacture and costly to transport due to its weight. These mounts are also relatively large and bulky and occupy a great deal of space on their mounting surfaces.

SUMMARY

One embodiment of the mounting device broadly comprises a flexible base for placement on a mounting surface and a bendable frame attached to or otherwise coupled with the base to permit the base to be shaped to at least partially conform to contours on the mounting surface. The base is preferably at least partially formed of a material that provides sufficient friction between its lower surface and the mounting surface to resist unwanted movement. The frame may be formed of aluminum, lead, tin, metal alloy, or other suitable material, and in one embodiment includes a central portion and a plurality of appendages each independently movable about at least two axes of movement. Each of the appendages may include a connecting link joined to the central portion and one or more arms extending from the connecting link and movable relative to one another and relative to the central portion.

Embodiments of the mounting device provide numerous advantages. For example, the bendable frame permits the device to be shaped to at least partially conform to the contours of a vehicle dash or other mounting surface to firmly support the attached electronic device on the mounting surface while minimizing the overall weight, thickness, and contact surface area of the mounting device. The shape and configuration of the mounting device also supports an electronic device in one or more places and uses the weight of the electronic device itself rather than extra weights to help retain the mounting device to a mounting surface. The configuration of the mounting device also places the weight of the electronic device over the relatively wider and therefore more stable front portion of the mounting device.

Embodiments of the mounting device illustrated and described herein are merely examples of devices that may be used to implement aspects of the invention and may be replaced with other devices without departing from the scope of the claims. These and other aspects of the present invention are described more fully in the detailed description below.

BRIEF DESCRIPTION OF THE DRAWING FIGURES

Embodiments of the present invention are described in detail below with referenced to the attached drawing figures, wherein.

Figure 1:
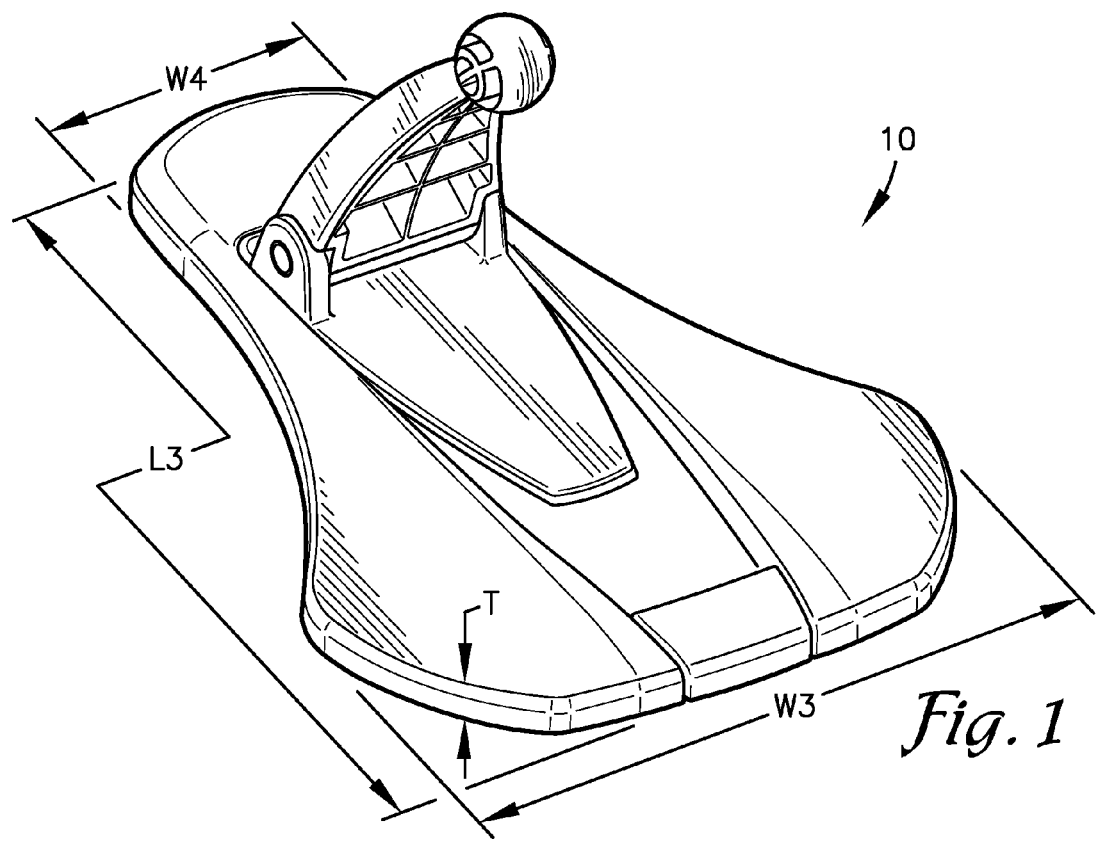
FIG. 1 is an isometric view of a mounting device constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
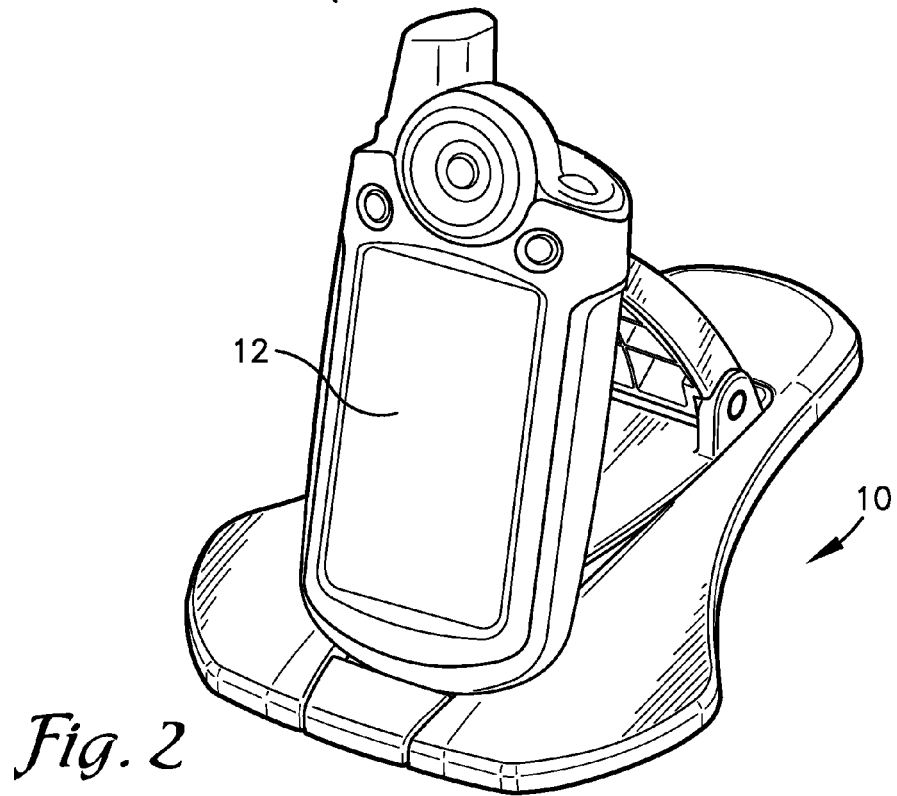
FIG. 2 is an isometric view of the mounting device of FIG. 1 with an exemplary electronic device attached thereto.

Turning now to the drawing figures, and particularly FIGS. 1 and 2, a mounting device 10 constructed in accordance with various embodiments of the invention is illustrated. The mounting device 10 is configured for removably securing an electronic device 12, such as a personal navigation device, navigation-enabled mobile phone, personal digital assistant, or any other device to a mounting surface, a vehicle dash or center console. The mounting surface may be a vehicle dash, center console, table, countertop, or any other surface and may be contoured or otherwise uneven and subject to vibrations or other movements.

Figure 3:
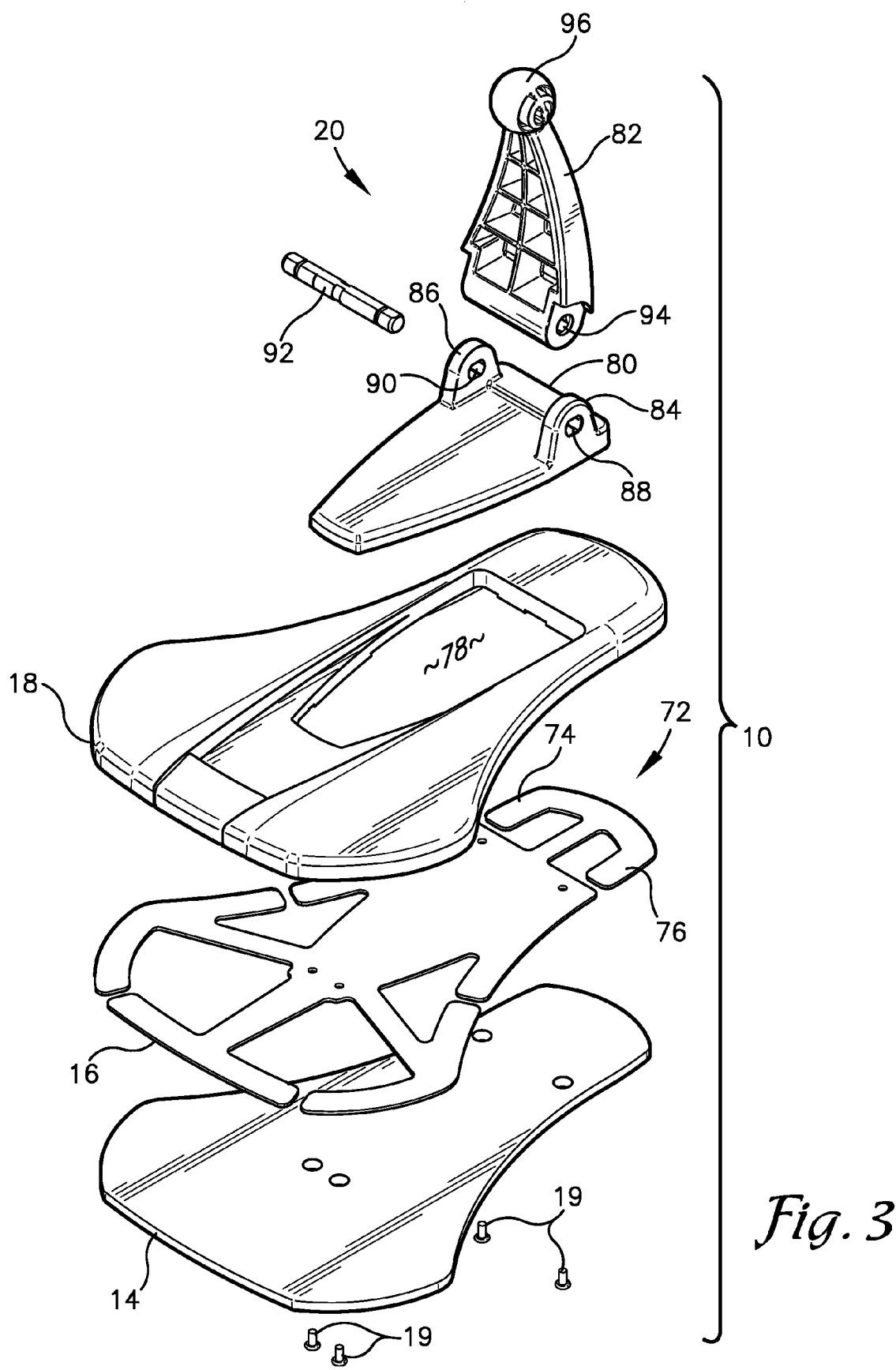
FIG. 3 is an exploded view of the mounting device of FIG. 1 shown with a bendable frame in accordance with an embodiment of the invention.

As shown in FIG. 3, an exemplary embodiment of the mounting device 10 broadly includes a flexible base 14, a bendable frame 16, a cover plate 18, and an attachment mechanism 20. The mounting device 10 and its constituent components illustrated and described herein are merely embodiments of the invention and may be replaced with other embodiments without departing from the scope of the claims.

In more detail, the flexible base 14 is configured to be placed on the mounting surface and is at least partially formed of a material that provides sufficient friction between its lower surface and the mounting surface to resist unwanted movement. In one embodiment, the base 14 is formed of a non-skid polymer material such as rubber, neoprene, silicone, or Sorbothane®. Such materials provide good adhesion to other surfaces without the use of adhesives and external fasteners and may offer vibration isolation and damping characteristics. These materials are also highly flexible to permit the base 14 to be shaped to at least partially conform to contours on the mounting surface. In one embodiment, the base is about 3 mm thick and tapers inwardly from front to back so that a front portion thereof is flared and wider than a back portion thereof, as is discussed below.

However, the mounting device 10, base 14, frame 16, and/or cover plate 18 may present any dimensions and the dimensions articulated herein are merely examples of various embodiments of the present invention. For example, the base 14 may be enlarged beyond the exemplary dimensions discussed herein to support large or heavy electronic devices and take any form, including basic circular and rectangular forms lacking the flared configuration discussed above.

The bendable frame 16 is sandwiched between the base 14 and the cover plate 18 and enables the base 14 to be shaped to at least partially conform to contours on the mounting surface. Importantly, the bendable frame 16 provides such shaping abilities while being lightweight and relatively thin. In one embodiment, the frame is formed of approximately 1 mm thick annealed aluminum, but it may also be formed in other sizes and of lead, tin, metal alloys, rubber, plastics, papers such as cardboard, natural products, or any other material that provides the desired shaping characteristics. Other dimensions of the frame 16 are discussed below.

Because the frame 16 is sandwiched between the base 14 and cover plate 18, it preferably has a peripheral shape similar to that of the base (it tapers inwardly from front to back). In some embodiments, the frame 16 is not formed of a continuous uninterrupted sheet of material, but instead includes a number of cut-outs or openings that define a plurality of independently bendable portions discussed below.

Figure 4:
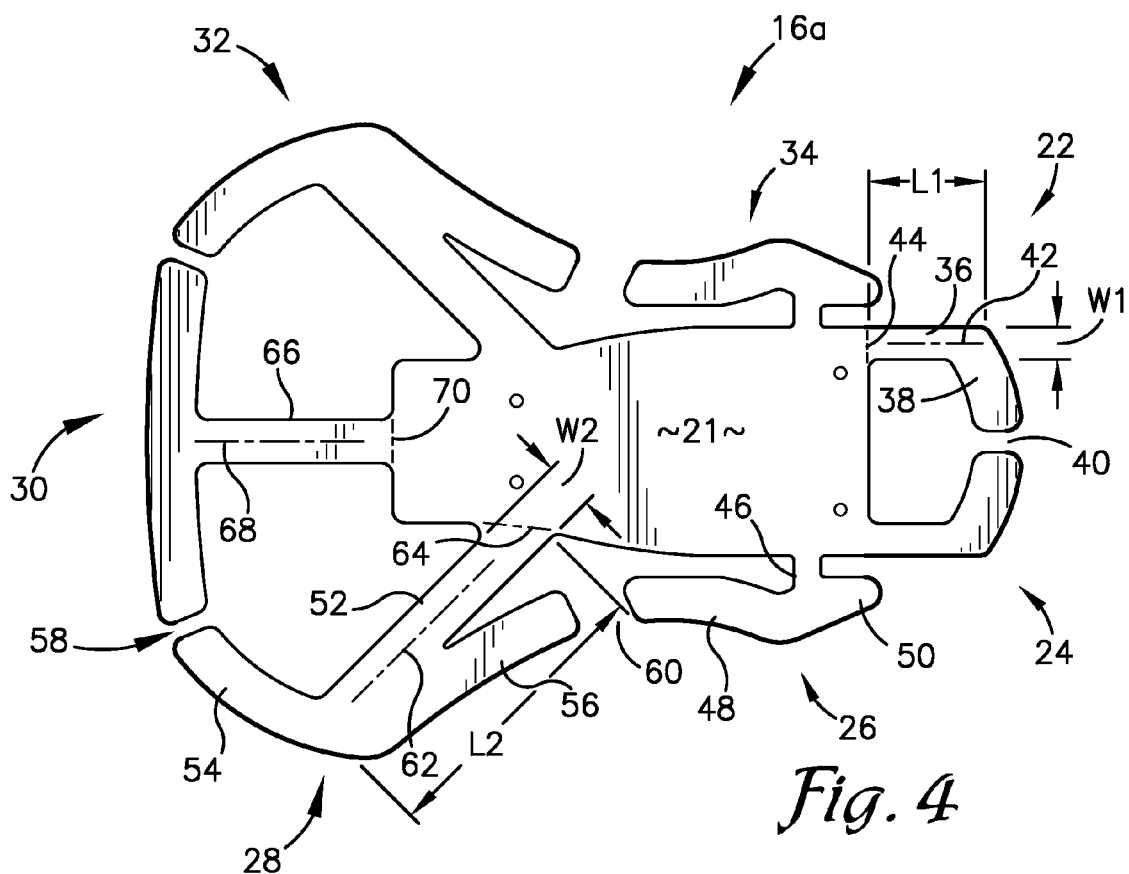
FIG. 4 is a top view of an alternative embodiment of the bendable frame.

An alternative embodiment of the bendable frame 16a is illustrated in FIG. 4 and includes a central portion 21 and seven appendages 22, 24, 26, 28, 30, 32, 34, each independently movable about at least two axes of movement and each including portions movable relative to one another and relative to the central portion 21. In more detail, the appendage 22 extends from the right side of the central portion 21 (from the perspective of FIG. 4) and includes a connecting link 36 joined to the central portion 21 and an arm 38 extending from the connecting link 36. The link 36 has a width W1 and a length L1. The width W1 and length L1 were chosen to achieve a desired amount of bending with a minimal amount of spring back. Particularly, applicants discovered that a length to width ratio L1/W1 in the range of 3-7 is preferred, with a ratio of 5 being more preferred. In one embodiment, the connecting link has a length L1 of approximately 28 mm and a width W1 of approximately 6 mm.

The arm 38 extends roughly perpendicularly to the longitudinal axis of the connecting link 36. Thus, the appendage 22 is generally L-shaped when viewed from the perspective of FIG. 4. The connecting link 36 and the overall configuration of the frame 16 permits the appendage 22 to be bent about at least two axes of movement. Specifically, the arm 38 may be twisted about an axis 42 to raise or lower the arm relative to the central portion 21 and bent about an axis 44 to raise or lower the entire appendage 22 relative to the central portion 21. The appendage 24 is basically a mirror image of the appendage 22. A small gap 40 exists between the distal ends of the appendages 22, 24 to permit them to bend freely and independently as discussed below.

The appendage 26 extends from a side of the central portion 21 and includes a relatively short connecting link 46 and a pair of arms 48, 50 extending from the link 46. As with the other appendages, the appendage 26 may be bent about two axes of movement. The appendage 34 is a mirror image of the appendage 26 and extends from the opposite side of the central portion 21.

The appendage 28 extends at an angle from the lower left side of the central portion 21 (from the perspective of FIG. 4) and includes a connecting link 52 joined to the central portion 21 and a pair of arms 54, 56 extending from the connecting link 52. The link 52 has a width W2 and a length L2. The width W2 and length L2 may be chosen to achieve a desired amount of bending with a minimal amount of springback. Particularly, a length to width ratio L2/W2 in the range of 3-8 is preferred, with a ratio of 6-7 being more preferred. However, any ratio may be employed. In one embodiment, the connecting link 52 has a length L2 of approximately 50 mm and a width W2 of approximately 7.5 mm. Small gaps 58, 60 exist between the distal end of each arm 54, 56 and the appendage 30 and the appendage 26, respectively, to permit the arms to bend freely.

As with the appendage 22, the connecting link 52 permits the arms 54, 56 to be bent about at least two axes of movement. Specifically, the arms may be individually or collectively twisted about an axis 62 to raise or lower the arms relative to the central portion 21 and may be bent about an axis 64 so that the entire appendage 28 can be raised or lowered relative to the central portion 21. The appendage 32 is a mirror image of the appendage 28 and extends from the opposite side of the central portion 21. The appendage 30 is similar to the appendages 28, 32 except that it has a slightly different shape and has a connecting link 66 that extends from the left portion of the central portion 21. The connecting link 66 permits the appendage 30 to be bent about at least two axes of movement, an axis 68 and an axis 70.

Figure 5:
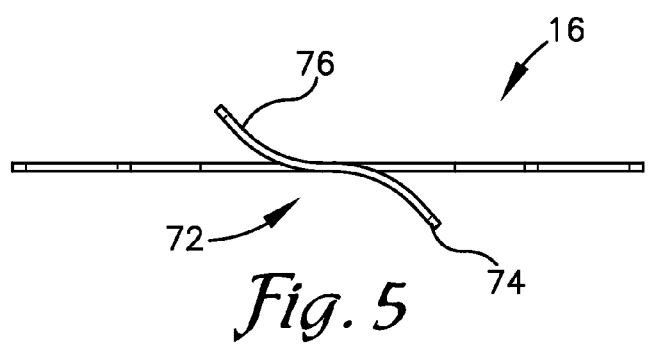
FIG. 5 is an end view of the bendable frame of FIG. 3 taken from the right side of FIG. 3 and showing one of the frame's appendages twisted about a first axis of movement.
Figure 6:
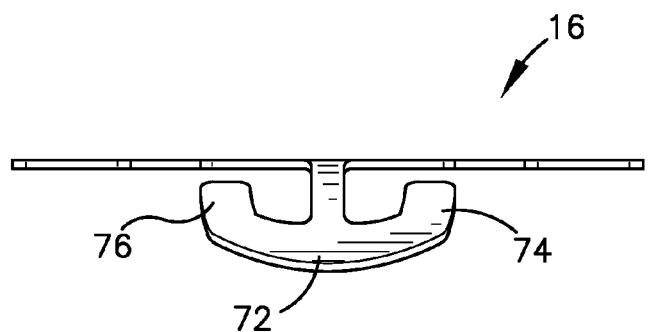
FIG. 6 is an end view of the bendable frame of FIG. 3 taken from the right side of FIG. 3 and showing one of the frame's appendages bent about a second axis of movement.

FIGS. 5 and 6 illustrate bending of an appendage 72 of the FIG. 3 embodiment of the frame 16. Arms 74, 76 of the appendage may be twisted about a first axis to individually or collectively raise or lower the arms 74, 76 as shown in FIG. 5 and/or bent about a second axis to raise or lower the entire appendage 72 as shown in FIG. 6.

Returning to FIG. 3, the cover plate 18 covers the bendable frame 16 and the base 14 and has a peripheral shape similar to that of the base and bendable frame. In an exemplary embodiment, the cover plate is formed of a flexible, pliable material such as rubber, silicone, neoprene, or other polymer. In some embodiments, the cover plate 18 may be comprised of weighted silicone, such as silicone with embedded filler. The embedded filler may comprise any weighted particles or other matter, such as aluminum oxide. Use of weighted silicone functions to advantageously increase the weight of the cover plate 18 without increasing the size of the mounting device 10. The cover plate may include a central cavity 78 for receiving components of the attachment mechanism as discussed below. Certain dimensions of the cover plate are also discussed below.

The attachment mechanism 20 supports the electronic device 12 on the base 14, frame 16, and cover plate 18, and in one embodiment includes a hinge anchor 80 positioned within the cavity 78 of the cover plate and a mounting arm 82 hingedly coupled with the hinge anchor. Both the hinge anchor 80 and the mounting arm 82 may be formed of injection molded plastic or other sufficiently rigid material. The hinge anchor 80 includes a pair of spaced-apart upstanding hinge pin supports 84, 86 with axially aligned pin holes 88, 90 for receiving a hinge pin 92. Similarly, one end of the mounting arm 82 is configured for placement between the pin supports 84, 86 and includes a pin hole 94 through which the hinge pin 92 extends. The distal end of the mounting arm 82 may include a ball joint 96 for receipt within a corresponding ball-type socket positioned on the electronic device.

The mounting arm 82 can be pivoted about the hinge pin 92 to raise or lower the attached electronic device 12 relative to the hinge anchor 80. The hinge pin 92 and/or hinge anchor 80 may include a frictional lock or other mechanism to hold the electronic device 12 in a desired position. The electronic device 12 may also be swiveled about the ball joint 88 to tilt and/or cant the electronic device to a desired viewing angle.

In one embodiment, the mounting arm 82 and the hinge anchor 80 are approximately the same length, and the hinge pin supports 84, 86 and the hinge pin 92 are positioned near the rear of the hinge anchor 80. This permits the electronic device 12 to be positioned so that its lower edge rests on the front of the hinge anchor 80 or the cover plate 18 rather than being suspended in the air as with many prior art mounts. Resting the lower edge of the electronic device 12 on the hinge anchor 80 or the front of the cover plate 18 utilizes the weight of the electronic device itself to assist in stabilizing and firmly adhering the mounting device to the mounting surface. Moreover, placing the hinge pin supports 84, 86 and hinge pin 92 on the rear portion of the hinge anchor 80 positions the electronic device 12 over the relatively wider and therefore more stable portions of the base 14, frame 16, and cover plate 18. Such a mounting arrangement may support the electronic device 12 in two places: its rear face with the ball joint 96 and its lower edge with the hinge anchor 80. However, in some configurations, the electronic device 12 may be supported only by the ball joint 96.

In some embodiments, the attachment mechanism 20 may employ elements other than the mounting arm 82 and hinge anchor 80. For example, the attachment mechanism 20 may include fixed (e.g., non-pivotable) mount arm and/or a mounting surface such as a flat plastic disk. The mounting surface provides an attachment location for conventional electronic device mounts such as suction cup mounts. Thus, a user may secure the electronic device to the attachment mechanism 20 by attaching a suction cup mount, or any other conventional electronic device mount, to the mounting surface.

The base 14, frame 16, and cover plate 18 may be joined by a plurality of screws or other fasteners 19 or may have a snap-fit or friction-fit. As best shown in FIG. 1, one embodiment of the assembled base 14, frame 16, and top cover 18 have a combined length L3, a maximum thickness T, and a front portion with a width W3 and a back portion with a width W4. W3 is greater than W4, and in a particular embodiment W3 is approximately 115 mm and W4 is approximately 50 mm. T is preferably no greater than about 30 mm, and in a particular embodiment is approximately 10-15 mm. L3 is preferably between 100 mm and 200 mm, and in one embodiment is approximately 160 mm.

The mounting device 10 described and illustrated herein provides numerous advantages. For example, the bendable frame 16 permits the device to be shaped to at least partially conform to the contours of a vehicle dash or other mounting surface to firmly support the attached electronic device 12 on the mounting surface while minimizing the overall weight, thickness, and contact surface area of the mounting device.

The shape and configuration of the mounting device 10 also supports the electronic device 12 in two places and uses the weight of the electronic device itself rather than extra weights to help retain the mounting device to the mounting surface. The configuration of the mounting device can also place the weight of the electronic device over the relatively wider and therefore more stable front portion of the device. Further, in embodiments employing the hinge anchor 80 and mounting arm 82, the mounting device 10 may be used to securely retain electronic devices of varying sizes. For example, the mounting arm 82 may be raised or lowered to accommodate any sized electronic device by supporting any electronic device in at least two places (at the arm 82 and base 14).

Although the invention has been described with reference to the embodiments illustrated in the attached drawing figures, it is noted that equivalents may be employed and substitutions made herein without departing from the scope of the invention as recited in the claims. For example, the mounting device 10 may be constructed of materials and in shapes and sizes other than those described and illustrated herein.

Having thus described various embodiments of the invention, what is claimed as new and desired to be protected by Letters Patent includes the following:

1. A mounting device for supporting an electronic device on a surface, the mounting device comprising:
   a flexible base for placement on the surface, the base including a front portion and a rear portion;
   a bendable frame coupled with the base and including a central portion and a plurality of appendages movable about two axes of movement to permit the base to be shaped to at least partially conform to contours on the surface; and
   a cover plate to at least partially cover the frame and the base,
   wherein at least two of the appendages are disposed above the front portion of the base and only one appendage is disposed above the back portion of the base,
   wherein each appendage includes a connecting link joined to the central portion and at least one arm extending therefrom,
   wherein each of the connecting links is movable relative to one another and relative to the central portion,
   wherein the arms of the appendages form a periphery of the bendable frame,
   wherein the arms, connecting links, and central portion form at least one gap within the periphery of the bendable frame,
   wherein at least one of the appendages includes a connecting link joined to the central portion and a pair of arms extending from the connecting link and bendable relative to one another and relative to the central portion,
   wherein the maximum thickness of the flexible base, bendable frame and cover plate are no greater than about 15 mm.

2. The mounting device as set forth in claim 1, the frame being formed of aluminum, lead, tin, rubber, plastic, paper, or a metal alloy.

3. The mounting device as set forth in claim 1, further including an attachment mechanism supported on the base and configured for removably coupling with the electronic device.

4. The mounting device as set forth in claim 3, wherein the attachment mechanism includes a mounting arm operable to at least partially support the electronic device.

5. The mounting device as set forth in claim 4, wherein the mounting arm is pivotable relative to the base and offset from the center of the base.

6. The mounting device as set forth in claim 1, the cover plate having a central cavity therein to at least partially receive the electronic device.

7. The mounting device as set forth in claim 3, wherein at least one of the connecting links has a width and a length, the length being at least three times the width.

8. The mounting device as set forth in claim 1, wherein the base tapers inwardly from front to back so that a front portion of the base is flared relative to a back portion.

9. The mounting device as set forth in claim 1, wherein the bendable frame includes at least four appendages, each including a connecting link joined to the central portion and a pair of arms extending from the connecting link.

10. The mounting device as set forth in claim 1, wherein the base is formed of a non-skid material.

11. The mounting device as set forth in claim 6, wherein the cover plate is formed of rubber or silicone material.

12. A mounting device for removably supporting an electronic device on a surface within a vehicle, the mounting device comprising:
　a flexible base for placement on the surface, the base including a front portion and a rear portion, the front portion being wider than the rear portion;
　a bendable frame positioned on top the base, the frame including a central portion and a plurality of appendages each independently movable about at least two axes of movement;
　a cover plate for at least partially covering the frame and the base, the cover plate having a central cavity; and
　an attachment mechanism including a mounting arm disposed at least partially above the rear portion and extending from the central cavity for removably coupling with the electronic device such that the electronic device is operable to be positioned on the cover plate and above the front portion when coupled to the mounting arm,
　wherein at least two of the appendages are disposed above the front portion of the base and only one appendage is disposed above the rear portion of the base,
　wherein each appendage includes a connecting link joined to the central portion and at least one arm extending therefrom,
　wherein each of the connecting links is movable relative to one another and relative to the central portion,
　wherein the arms of the appendages form a periphery of the bendable frame,
　wherein the arms, connecting links, and central portion form at least one gap within the periphery of the bendable frame,
　wherein at least one of the appendages including a connecting link joined to the central portion and a pair of arms extending from the connecting link and bendable relative to one another and relative to the central portion,
　wherein the maximum thickness of the flexible base, bendable frame and cover plate are no greater than about 15 mm.

13. The mounting device as set forth in claim 12, wherein a distal end of the mounting arm includes a ball mount for receipt within a corresponding socket associated with the electronic device.

14. The mounting device as set forth in claim 12, the frame being formed of aluminum, lead, tin, rubber, plastic, paper, or a metal alloy.

15. The mounting device as set forth in claim 12, the link of at least one of the appendages having a width and a length, the length being at least three times the width.

16. The mounting device as set forth in claim 12, wherein the base is formed of a non-skid material.

17. The mounting device as set forth in claim 12, wherein the cover plate is formed of rubber or silicone material.

18. A mounting device for removably supporting an electronic device on a surface within a vehicle, the mounting device comprising:
　a flexible base for placement on the surface, the base including a front portion and a rear portion, the front portion being wider than the rear portion;
　a bendable frame positioned on top the base, the frame including a central portion and a plurality of appendages each independently movable about at least two axes of movement;
　a cover plate for at least partially covering the frame and the base, the cover plate having a central cavity;
　an attachment mechanism including a mounting arm disposed at least partially above the rear portion and extending from the central cavity for removably coupling with the electronic device such that the electronic device is operable to be positioned on the cover plate and above the front portion when coupled to the mounting arm; and
　a hinge anchor positioned within the central cavity to hingedly couple the mounting arm to the base,
　wherein each appendage includes a connecting link joined to the central portion and at least one arm extending therefrom,
　wherein each of the connecting links is movable relative to one another and relative to the central portion,
　wherein the arms of the appendages form a periphery of the bendable frame,
　wherein the arms, connecting links, and central portion form at least one gap within the periphery of the bendable frame,
　wherein at least one of the appendages including a connecting link joined to the central portion and a pair of arms extending from the connecting link and bendable relative to one another and relative to the central portion,
　wherein the maximum thickness of the flexible base, bendable frame and cover plate are no greater than about 15 mm.

\* \* \* \* \*